3,542,526
CADMIUM SULFO-SELENIDE PIGMENTS
Terry Roy Peterson, Glens Falls, N.Y., assignor to Hercules Incorporated, Wilmington, Del., a corporation of Delaware
No Drawing. Filed Nov. 26, 1968, Ser. No. 779,242
Int. Cl. C01g 11/00; C01b 19/00
U.S. Cl. 23—315      3 Claims

ABSTRACT OF THE DISCLOSURE

An essentially transparent cadmium sulfo-selenide pigment which has a cubic crystalline structure is described. The cubic crystalline form of the pigment is obtained by heating an aqueous slurry of crude cadmium sulfo-selenide at 90 to 160° C. in the presence of 1000 to 2000% of an alkali metal hydroxide and 50 to 150% of an alkali or alkaline earth metal nitrate, carbonate, sulfate, halide or aluminate, by weight of dry crude.

---

This invention relates to novel cadmium sulfo-selenide pigments and more particularly to the essentially transparent cadmium sulfo-selenide pigments which have a cubic crystalline structure, and to a process for producing the same.

Crude cadmium sulfo-selenides heretobefore have been converted into pigment grade materials by heating the crude in a non-oxidizing atmosphere at elevated temperatures of about 400° C. (the so-called calcination treatment), by heating the crude in aqueous medium under pressure in the presence of weak alkali at elevated temperatures and preferably at about 360° C., or by heating the crude in a molten salt eutectic mixture of sodium hydroxide and sodium chloride or potassium chloride and lithium chloride at about 400° C. These prior art treatments require high temperatures to develop the crystal growth and aggregate formation necessary for good color. This results in a loss of expensive raw material such as selenium as well as undesirable side reactions such as oxidation which produce brown cadmium oxide. Moreover, the pigments so produced are of a hexagonal crystalline structure and opaque.

Now, in accordance with the present invention, there has been found a new crystalline form of cadmium sulfoselenide pigment, which form differs from that of the prior art by being cubic rather than hexagonal, possessing greater strength and by being highly transparent rather than opaque. More specifically, the present invention is directed to a cubic crystalline, essentially transparent cadmium sulfo-selenide pigment having an X-ray diffraction pattern which exhibits $d$-spacings of a relative intensity greater than about 25 at about 3.4, 2.1 and 1.8 A., and of a relative intensity less than about 25 at about 3.6, 3.2 and 1.9 A. and to a process for producing the same.

The novel crystalline pigments of the present invention are prepared by heating an aqueous slurry of crude cadmium sulfo-selenide in the presence of 1000-2000% of alkali metal hydroxide, and 50-150% of an alkali or alkaline earth metal salt selected from the group consisting of nitrates, carbonates, sulfates, halides and aluminates based on the weight of dry crude at a temperature ranging from about 90° C. to about 160° C., and then recovering the pigmentary product.

The crude cadmium sulfo-selenide slurry used to form the pigment of this invention can be prepared by any of the known methods, as for example according to the procedure of U.S. Pats. 2,148,194 and 2,605,167. The crude pigment is preferably prepared by reacting an aqueous slurry of insoluble cadmium salt and soluble cadmium salt with a sulfo-selenide solution such as sodium sulfo-selenide, the slurry being formed by mixing the desired salts in water or, if desired, forming the salts in situ, as by double decomposition. Typically, the insoluble salt is cadmium carbonate, cadmium hydroxide, cadmium oxide and the like and the soluble salt is cadmium nitrate, cadmium sulfate, and the like. By the suitable choice of raw materials such as cadmium, sulfur, and selenium, a series of crudes can be produced yielding highly colored pigments with hues ranging from light orange to deep maroon.

As stated, the method for producing the cubic crystalline cadmium sulfo-selenide pigments of the present invention requires heating an aqueous slurry of crude cadmium sulfo-selenide at a temperature between about 90 and about 160° C. in the presence of a specified amount of a strong alkali metal hydroxide and of an alkali or alkaline earth metal salt, and then separating the pigmentary product from the aqueous medium. The alkali metal hydroxide used can be any hydroxide of a monovalent metal of the first group of the periodic system, that is lithium, sodium, potassium, rubidium or cesium, and is used in an amount ranging from 1000–2000% by weight of dry crude. The metal salt which is used in conjunction with the alkali metal hydroxide is the chloride, carbonate, nitrate, sulfate, or aluminate of an alkali metal, and preferably lithium, sodium or potassium, or of an alkaline earth metal, and preferably, magnesium, calcium, strontium or barium, and is most preferably sodium nitrate, sodium carbonate, potassium carbonate, sodium sulfate, calcium nitrate, sodium bromide, sodium aluminate, potassium nitrate, potassium sulfate and the like. The amount of metal salt used can be varied within relatively large limits as, for example, from about 50–150% by weight of dry crude. Preferably, however, the amount will range from about 75% to about 125% by weight of dry crude.

In the process of the invention, the crude pigment slurry containing the alkali metal hydroxide and the alkali or alkaline earth metal salt, as indicated, is heated at about 90 to about 160° C. and preferably at about 145° C. to about 155° C. at atmospheric pressure for a length of time which will vary in accordance with the specific temperature employed. Usually, from about 30 minutes at 160° C. to about 12 hours at 90° C. are required to convert the crude to the cubic crystalline form of the present invention.

The final color of the pigment product is dependent upon a number of factors which can be related to the composition of the crude, and to the treatment in strong caustic solution. For example, the degree of redness of hue of the final pigment is directly related to the ratio of cadmium sulfide to cadmium selenide in the crude material. In general, the products become redder as the ratio of cadmium selenide to cadmium sulfide increases in the mixed crystal and more orange-yellow as this ratio decreases. Although it is possible to vary the ratio of cadmium to selenium and/or sulfide to limits representing essentially pure cadmium sulfide or pure cadmium selenide respectively, certain ratios are preferred since they represent color hues most desirable for commercial pigment applications. Lighter (yellower) or deeper (redder) shades of cubic cadmium sulfo-selenide pigment can be prepared in accordance with this invention if such shades are warranted.

The invention will now be illustrated by reference to the following examples in which all percentages and parts are by weight unless otherwise specified.

EXAMPLE 1

A crude cadmium sulfo-selenide pigment slurry was prepared by adding a solution of sodium sulfo-selenide (previously prepared by dissolving 9 parts of selenium in 600 parts of water containing 234 parts of crystalline sodium sulfide, $Na_2S \cdot 9H_2O$ at 85° C.) over 10 minutes to an agitated slurry of cadmium carbonate and cadmium nitrate maintained at 50° C., the slurry having been prepared by reacting 500 parts of a 47.5% aqueous solution of cadmium nitrate with 400 parts of a 0.75% aqueous solution of sodium carbonate at 25° C. Agitation was continued for one hour at the same temperature, after which time, the volume was adjusted to 3000 parts with water. To 1107 parts of the above crude cadmium sulfo-selenide slurry (containing 57 parts of sodium nitrate) was added 1000 parts of solid sodium hydroxide, and the mixture heated at 150–155° C. for 5.5 hours with constant agitation, after which time the mixture was quenched in 2000 parts of cold water (5–15° C.). The pigment product which was isolated by decantation, washed and then dried at 82° C. was a highly transparent, light orange cubic cadmium sulfo-selenide pigment exhibiting the following X-ray diffraction pattern:

| dA.[1] | Percent relative intensity [2] |
|---|---|
| 3.61 | 10 |
| 3.40 | 100 |
| 3.18 | 12 |
| 2.94 | 24 |
| 2.46 | 3 |
| 2.08 | 60 |
| 1.91 | 5 |
| 1.77 | 51 |
| 1.69 | 7 |
| 1.47 | 9 |
| 1.35 | 14 |
| 1.31 | 6 |
| 1.20 | 13 |
| 1.13 | 8 |
| 1.04 | 3 |
| 0.99 | 7 |

[1] Interplanar spacing expressed in angstrom units (A).
[2] The intensity in counts per second over background divided by the intensity of the strongest line and expressed as percent.

EXAMPLE 2

A crude cadmium sulfo-selenide pigment was prepared by adding a solution of sodium sulfo-selenide (previously prepared by dissolving 21 parts of selenium in 600 parts of water containing 198 parts of crystalline sodium sulfide, $Na_2S \cdot 9H_2O$ at 85° C.) over a period of 7 minutes to an agitated slurry of cadmium carbonate and cadmium nitrate at 50° C., the slurry having been prepared by reacting 500 parts of a 45% aqueous solution of cadmium nitrate with 413 parts of a 3.3% aqueous solution of sodium carbonate at 25° C., and continuing the agitation at 50° C. for 1 hour, after which time the crude cadmium sulfo-selenide precipitate was removed by filtration and washed to remove soluble salts. 200 parts of the wet crude prepared above (50 parts crude, dry basis) was reslurried with 850 parts of water containing 51 parts of sodium nitrate, and 1000 parts of solid sodium hydroxide was added with constant stirring. The mixture was heated to 150–155° C. and maintained thereat for 5½ hours with constant stirring, after which time, the mixture was quenched in cold water. The medium red, cadmium sulfo-selenide pigment which was recovered as in the previous example contained, by elemental analysis, 70.1% cadmium, 13.4% selenium and 16.8% sulfur (Theory: 69.5% cadmium, 13.6% selenium and 17.1% sulfur). The pigment displayed a cubic crystalline structure, was highly transparent, and exhibited the following X-ray diffraction pattern:

| dA.[1] | Percent relative intensity [2] |
|---|---|
| 3.61 | 8 |
| 3.41 | 100 |
| 3.18 | 8 |
| 2.95 | 16 |
| 2.08 | 60 |
| 1.78 | 35 |
| 1.70 | 3 |
| 1.47 | 6 |
| 1.35 | 11 |
| 1.32 | 11 |
| 1.20 | 9 |
| 1.13 | 6 |
| 1.04 | 4 |
| 0.99 | 5 |

[1] Interplanar spacing expressed in angstrom units (A).
[2] The intensity in counts per second over background divided by the intensity of the strongest line and expressed as percent.

For the sake of comparison, portions of the crude cadmium sulfo-selenide prepared according to this example were heat-treated according to the procedure of U.S. Pat. 2,148,194 to Drucker. In these comparisons, 200 parts (50 parts dry) of crude were slurried with 600 parts of water, and (a) 25 parts of sodium nitrate and 5 parts sodium hydroxide, (b) 51 parts of sodium nitrate and 5 parts of sodium hydroxide, (c) 51 parts of sodium nitrate and 10 parts of sodium hydroxide, (d) 50 parts of sodium sulfide and 5 parts of sodium carbonate, or (e) 100 parts of sodium hydroxide and 51 parts of sodium nitrate and heated under 5 atmospheres pressure at 150–175° C. for 5 to 5½ hours. The recovered products were, in all cases, brown precipitates (similar to untreated crude) having no pigment value as such.

EXAMPLE 3

The procedure of Example 1 was repeated except that in this example the crude pigment was prepared from a sodium sulfo-selenide solution containing 27 parts of selenium dissolved in 600 parts of water containing 178 parts of crystalline sodium sulfide, $Na_2S \cdot 9H_2O$ and a slurry of cadmium carbonate and cadmium nitrate prepared by reacting 500 parts of a 44% aqueous solution of cadmium nitrate with 421 parts of a 5% aqueous solution of sodium carbonate, and the heating was carried out for 7 hours. The product was a transparent, red, cadmium sulfo-selenide pigment having an X-ray diffraction pattern characteristic of the cubic crystalline structure. The X-ray diffraction pattern of the pigment of this example and that of cubic crystalline cadmium sulfide are tabulated below.

| Example 3 | | Cubic Cds. | |
|---|---|---|---|
| dA.[1] | Percent relative intensity [2] | dA.[1] | Percent relative intensity [2] |
| 3.62 | 9 | 3.36 | 100 |
| 3.42 | 100 | 2.90 | 40 |
| 3.19 | 7 | 2.06 | 80 |
| 2.96 | 10 | 1.75 | 60 |
| 2.09 | 64 | 1.68 | 10 |
| 1.91 | 3 | 1.45 | 20 |
| 1.78 | 37 | 1.34 | 30 |
| 1.70 | 4 | 1.30 | 10 |
| 1.48 | 6 | 1.19 | 30 |
| 1.47 | s[3] | | |
| 1.35 | 9 | | |
| 1.32 | 4 | | |
| 1.20 | 10 | | |
| 1.14 | 5 | | |
| 1.04 | 3 | | |
| 1.00 | 5 | | |

[1] Interplanar spacing expressed in angstrom units (A).
[2] The intensity in counts per second over background divided by the intensity of the strongest line and expressed as percent.
[3] s=an unresolved shoulder on a more intense reflection.

For the sake of comparison, cadmium sulfo-selenide pigments were also prepared according to the Example of U.S. 2,148,194 and Example 1 of U.S. 3,002,846, the pigments being labeled Pigment A and B, respectively. Pigments A and B gave X-ray diffraction patterns characteristic of the hexagonal crystalline structure, and exhibited strongest $d$-spacings (intensity greater than 25) at about 3.6, 3.4, 3.2, 2.1, 1.9 and 1.8 angstroms. Pigments A and B were also opaque in plastics, less red in hue, about 50% weaker, and of lower gloss in dried ink than the pigment of this example. The X-ray diffraction patterns of pigments A and B and that for the hexagonal crystalline form of cadmium sulfide are tabulated below.

| Pigment A | | Pigment B | | Hexagonal CdS | |
|---|---|---|---|---|---|
| dA.[1] | Percent relative intensity[2] | dA.[1] | Percent relative intensity[2] | dA.[1] | Percent relative intensity[2] |
| 3.61 | 83 | 3.67 | 98 | 3.58 | 75 |
| 3.39 | 62 | 3.44 | 70 | 3.36 | 89 |
| 3.19 | 100 | 3.23 | 100 | 3.16 | 100 |
| 2.47 | 36 | 2.50 | 39 | 2.45 | 25 |
| 2.08 | 84 | 2.47 | s[3] | 2.07 | 57 |
| 1.91 | 48 | 2.11 | 84 | 1.90 | 42 |
| 1.80 | 10 | 1.94 | 63 | 1.79 | 17 |
| 1.77 | 57 | 1.82 | 24 | 1.78 | 68 |
| 1.74 | 18 | 1.80 | 50 | 1.75 | 18 |
| 1.59 | 5 | 1.76 | 18 | 1.65 | 8 |
| 1.43 | 20 | 1.61 | 8 | 1.40 | 15 |
| 1.34 | 11 | 1.58 | 7 | 1.33 | 11 |
| 1.27 | 14 | 1.43 | 18 | 1.28 | 12 |
| | | 1.38 | 6 | | |
| | | 1.35 | 10 | | |
| | | 1.28 | 14 | | |

[1] Interplanar spacing expressed in angstrom units (A).
[2] The intensity in counts per second over background divided by the intensity of the strongest line and expressed as percent.
[3] s=an unresolved shoulder on a more intense reflection.

What I claim and desire to protect by Letters Patent is:

1. An essentially transparent cadmium sulfo-selenide pigment having an X-ray diffraction pattern characteristic of the cubic crystalline structure and exhibiting $d$-spacings of a relative intensity greater than about 25 at about 3.4, 2.1 and 1.8 angstroms and a relative intensity less than about 25 at about 3.6, 3.2 and 1.9 angstroms.

2. A process for producing the pigment of claim 1 which comprises heating an aqueous slurry of crude cadmium sulfo-selenide pigment in the presence of 1000–2000% of an alkali metal hydroxide and 50–150% of an alkali or alkaline earth metal salt selected from the group consisting of nitrates, carbonates, sulfates, halides and aluminates, by weight of dry crude, at a temperature ranging from about 90° C. to about 160° C., and then recovering the pigmentary product.

3. The process of claim 2 wherein the alkali metal hydroxide is sodium hydroxide and the metal salt is sodium nitrate.

References Cited

UNITED STATES PATENTS

| | | | |
|---|---|---|---|
| 2,173,128 | 9/1939 | O'Brien | 106—301 X |
| 2,504,147 | 4/1950 | O'Brien | 23—315 X |
| 2,578,363 | 12/1951 | Marcot | 106—301 |
| 2,777,777 | 1/1957 | Allan et al. | 106—301 |
| 3,385,656 | 5/1968 | Aven | 23—50 |

OTHER REFERENCES

Vitrikhovskii et al., "Soviet Physics—Solid State," vol. 1, 1959, pp. 358–363.

HERBERT T. CARTER, Primary Examiner

U.S. Cl. X.R.

23—50; 106—301